United States Patent Office 2,909,343
Patented Oct. 20, 1959

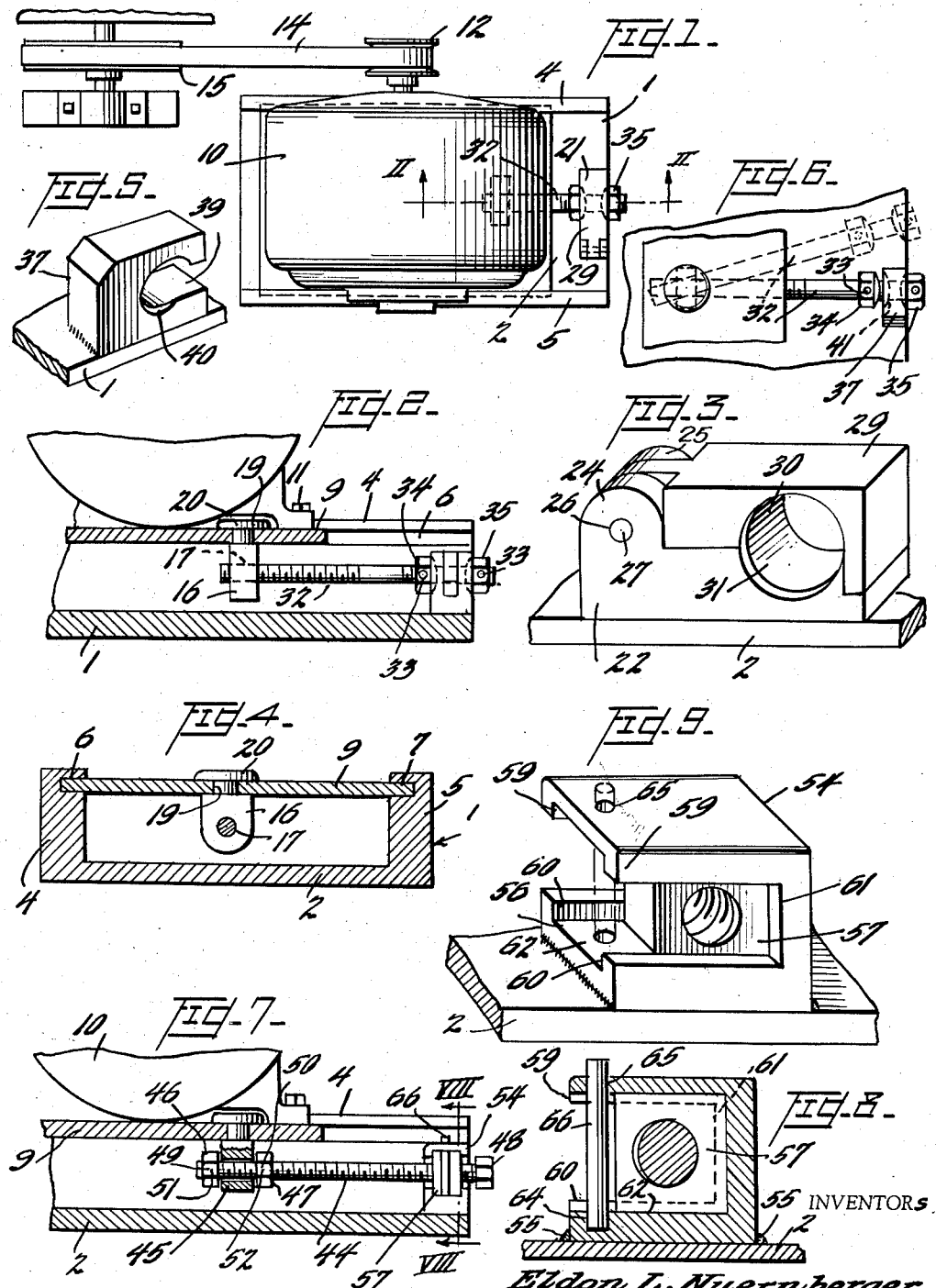

2,909,343

QUICK-SLIDE MOTOR MOUNT

Eldon L. Nuernberger, Chambersburg, and William A. Williams, Philadelphia, Pa., assignors to T. B. Wood's Sons Company, a corporation of Pennsylvania Application November 16, 1954, Serial No. 469,188

5 Claims. (Cl. 248—23)

This invention relates to improvements in slidable motor mounts which are readily releasable, and particularly to mounts for electric motors which drive variable pitch pulleys or sheaves for power transmission belts. In the operation of this type of power transmission machinery, when it is desired to make a change in the drive ratio by adjustment of the sheaves it is desirable to release the tension on the belt during the adjustment. Heretofore this has been done by a slow and tedious operation requiring the turning, by means of a wrench, or the like tool, of an adjustment screw which is ordinarily located adjacent the supporting floor in an inconvenient location where operation of the tool is difficult.

An object of this invention is to provide a motor mount in which, by various means, the adjustment screw for the slide on which the motor actually rests is releasable so that the motor slide can be moved freely to provide almost immediate freedom of all tension, and, conversely, can be moved back into a position providing tension and where the adjustment screw can be again connected for making the final adjustment of the position of the motor and hence of the tension applied to the belt.

In the accompanying drawings several embodiments of quickly adjustable motor mounts are shown by way of example.

In the drawings, Figure 1 is a plan view of a motor in position for driving and mounted on a slide which is releasable by mechanism according to this invention.

Figure 2 is an enlarged partial vertical sectional view on section line II—II of Fig. 1.

Figure 3 is a perspective view of a holding and releasing clamp or hasp according to the embodiment of Figs. 1 and 2.

Figure 4 is a transverse sectional view of the bed plate, adjustable slide and adjusting mechanism of Figs. 1 and 2.

Figure 5 is an enlarged perspective view of a modified form of hasp member suitable for use in the organization according to Fig. 1 in place of the hasp member shown in Fig. 3.

Figure 6 is a partial plan view of the adjusting screw and its latching part shown in connected and disconnected positions, the hasp member being according to Fig. 5.

Figure 7 is a longitudinal sectional view of the bed plate and adjusting mechanism of a third embodiment of the invention.

Figure 8 is a transverse sectional view of the holding and releasing mechanism of the embodiment according to Figure 7.

Figure 9 is a perspective view of the holding and releasing mechanism according to Fig. 7.

In Fig. 1 of the accompanying drawings numeral 1 indicates a motor bed plate which is intended to be fixedly, permanently attached to the floor or other supporting surface. The bed plate has a flat bottom wall 2 and longitudinally extending upstanding side walls 4 and 5 along its edges. Walls 4 and 5 are provided with longitudinally extending inwardly opening guide grooves 6, 7, spaced apart laterally, in which a motor slide plate 9 is slidably mounted. The grooves 6 and 7 are located in the upstanding walls at positions spaced above the bottom wall 2 so that an open space is located beneath slide plate 9.

Motor 10 is mounted on slide plate 9 in any conventional manner as by bolts 11. Motor 10 drives sheave 12, over which runs a belt 14 which drives sheave 15. The sheaves 12 and 15 are adjustable in pitch for altering the drive ratio and belt 14 is of the V type. However, the details of the sheaves comprise no part of the present invention and therefore are not shown or described herein.

When it is desired to make a change in the drive ratio by altering the pitches of the sheaves it is preferable to slacken belt 14. This is done by moving the motor 10 and sheave 12 toward sheave 15 by moving motor slide 9 in the proper direction in grooves 6 and 7. After making the desired adjustment, the motor 10, sheave 12, and slide 9 are moved in the opposite direction to take up the slack in belt 14.

To provide for both quick release and retention of the slide, various embodiments of mechanisms have been devised according to the present invention. In Fig. 1 the bottom surface of the slide 9 is provided with a depending rotatable nut 16 having a screw threaded bore 17 extending laterally therethrough. Nut 16 extends downwardly through a bore 19 in slide plate 9. The upper end portion of nut 16 is provided with an outwardly extending flange 20 of larger diameter than bore 19 for retaining the nut in bore 19.

Adjacent one edge of the bottom plate 2 of the bed plate 1 is secured a holding latch member 21 composed of a block 22 formed with a pair of rounded lugs 24, 25 spaced apart in the direction of adjustment of the motor 10 and having transverse, aligned bores 26 therein for passage of a hinge pintle 27. A locking member 29 is hingedly connected with pintle 27 and is provided with a semi-cylindrical recess 30 which when in closed position is opposite a correspondingly shaped recess 31 in block 22 in such manner that the two recesses form a bore through which extends an adjustment screw 32. One end portion of this screw is screw threadedly engaged in the screw threaded bore 17 in nut 16. On opposite sides of holding member 21, the screw 32 is provided with fixed nuts 34, 35 serving as abutments for engaging against the latch. These nuts 34 and 35 are fixedly held in place on screw 32 by roll pins 33.

To alter the pitch of the drive sheaves, the belt tension is partly relieved by a small adjustment of screw 32 by turning head nut 35. Locking member 29 is then raised, opening the recess in which part of screw 32 is accommodated, and completely releasing the adjustment screw and motor slide plate 9. The motor 10 is then moved to the left as in Fig. 1 to completely release the belt tension and the desired adjustment of the pitch of the sheaves is made. The motor 10 and its slide 9 are then moved to the right to tension the belt and the adjustment screw is placed in position to be engaged and held in the holding latch member 21 and the locking member 29 is swung into locking position. The final adjustment of the belt tension is effected by further adjustment of screw 32 by turning head nut 35.

In the form of the invention represented by Figs. 5 and 6 all parts and arrangements are similar to those of the first embodiment represented by Figs. 1, 2, 3 and 4 except the holding latch member 21 of the first embodiment is substituted by a block-like holding member 37 which is formed with a laterally opening recess or slot 39 wide enough for the adjusting screw 32 to enter from the side. The block-like member 37 at the inner end of the slot 39 is provided with a recessed seat 40 on its outer surface for accommodating the fixed abutment head nut 35 of the adjusting screw when the head is in engaged position, that is, in its position of operation.

The opposite face of the block-like member 37 is also provided with a similarly located recess 41 for partially accommodating abutment nut 34 when the adjustment screw is loosened for removal from the holder. In the present embodiment the abutment nuts 34 and 35 must be spaced far enough apart to permit entry and removal of the adjusting screw into and from slot 39.

In the operation of the embodiment according to Figs. 5 and 6 when it is desired to change the drive ratio of the belt, the adjustment screw is turned sufficiently to relax the tension on the belt and is then swung to the position indicated in broken lines in Fig. 6, and the motor slide 9 with the motor 10 and its sheave 12 is slid to the left, considered as in Fig. 1 to completely free the sheaves from interference by the belt and the desired adjustments of the pitch of the sheaves is made unhampered by the belt. The motor 10 on its slide 9 is then moved to the right and adjustment screw 32 is swung into the slot 39 in engagement with holding block or latch 37 and the adjusting screw is then turned relative to nut 16 to make the final adjustment of the tension on belt 14.

In a third embodiment of the invention, illustrated by Figs. 7, 8 and 9, the parts and arrangements are similar to those of Fig. 1, except in this embodiment the adjusting screw 44 passes freely through an opening in a rotatably mounted swivel 45 depending from motor slide 9. On each side of swivel 45 is located a nut 46 and 47 which are fixed on the adjusting screw by roll pins 49 and 50 which extend laterally through screw threaded openings 51 and 52 in nuts 46 and 47 respectively, and engage the adjusting screw 44. At the free end portion of adjusting screw 44 a cage member 54 is mounted on the bottom wall 2 of bed plate 1 to which it is secured as by welding 55. The cage-like holding and releasing latch member 54 is formed with a central opening 56 in which is positioned angular nut 57 having its screw-threaded bore extending in the direction to screw-threadedly receive adjusting screw 44. The cage member 54 has one of its faces open to allow insertion and removal of nut 57 and on its front and rear faces is provided with inwardly extending flanges 59 and 60 forming guiding and retaining walls for nut 57. The other side wall may also be provided with inwardly extending flanges 61 between which the nut 57 is accommodated.

The bottom wall 62 of cage member 54 is provided with a vertically extending bore 64, adjacent the open face of the cage, and the upper wall is provided with a bored hole 65 opposite bore 64, and a locking pin 66 is adapted to extend into bores 64 and 65 for locking nut 57 in the cage member.

When it is desired to adjust the pitch of the sheaves 12 and 15 adjusting screw 44 is turned, by means of its head 48, relative to nut 57 to relax the tension on belt 15, pin 65 is removed, and nut 57 is unlatched by being moved laterally out of the cage-like latching member 54 through its open face, during which movement adjusting screw 44 and swivel 45 are swung about the axis of said swivel. The motor 10 and slide 9 are slid to the left to fully relax belt 15. When the pitch of the sheaves has been adjusted slide 9 is returned to approximately its initial position, nut 57 is returned to cage 57 and locked therein by pin 66, and adjusting screw 44 is then turned relative to nut 57 to apply the final tension to belt 15.

We claim:

1. An adjustable motor mount comprising in combination, a main base member having guide surfaces thereon, spaced apart from each other, a motor slide member mounted to slide along said guide surfaces, a single adjusting screw located centrally between said spaced guide surfaces, a first means connecting one portion of said screw with one of said members, a second means connecting another portion of said screw with the other member; said first connecting means comprising a latch block having a recess opening through and extending inwardly from one edge thereof releasably receiving said screw, and interengaging means between said screw and block for transmitting stress between said screw and block in both directions longitudinally of said screw, the connection of said second connecting means with the member to which it is connected being pivotal for swinging of said screw in and out of said recess of said latch block when the stress between said screw and said block is released, interengaging means transmitting stress in both directions longitudinally of said screw between said screw and said pivotal connecting means, one of said interengaging means comprising interengaged screw threads by means of which stress is applied and released between said members in both directions of extent of said screw.

2. An adjustable motor mount according to claim 1, and in which said interengaged screw threads are on said screw and said pivotal connecting means.

3. An adjustable motor mount according to claim 2, and in which the interengaging means of said screw and latch block comprises spaced abutments on said screw and engaging said block, said abutment means being spaced apart in the direction of extent of said screw.

4. An adjustable motor mount according to claim 3, and in which said pivotal connection is connected with said motor slide member.

5. An adjustable motor mount according to claim 1, in which said interengaged screw threads are on said screw and the means connecting said screw with said main base member.

References Cited in the file of this patent

UNITED STATES PATENTS

| | | |
|---|---|---|
| 526,066 | Wood | Sept. 18, 1894 |
| 537,714 | Pettingell | Apr. 16, 1895 |
| 919,548 | Delhomme | Apr. 27, 1909 |
| 1,616,191 | Lipman | Feb. 1, 1927 |
| 1,628,620 | Steen | May 10, 1927 |
| 1,632,538 | Brogden | June 14, 1927 |
| 1,778,492 | Greene | Oct. 14, 1930 |
| 1,878,983 | Harris | Sept. 20, 1932 |
| 2,498,392 | Boyle | Feb. 21, 1950 |
| 2,546,336 | Gibbons | Mar. 27, 1951 |
| 2,674,130 | Spychalla | Apr. 6, 1954 |
| 2,728,552 | Fate | Dec. 27, 1955 |